United States Patent
Shima et al.

[11] Patent Number: 5,944,827
[45] Date of Patent: *Aug. 31, 1999

[54] POWER SAVING CONTROL SYSTEM AND METHOD FOR USE WITH SERIALLY CONNECTED ELECTRONIC DEVICES

[75] Inventors: Hisato Shima; Ichiro Hamada, both of Kanagawa; Makoto Sato; Yasuo Kusagaya, both of Tokyo, all of Japan

[73] Assignee: Sony Corporation, Tokyo, Japan

[*] Notice: This patent is subject to a terminal disclaimer.

[21] Appl. No.: 09/038,474

[22] Filed: Feb. 2, 1998

Related U.S. Application Data

[62] Division of application No. 08/598,946, Feb. 9, 1996, Pat. No. 5,790,876.

[30] Foreign Application Priority Data

Feb. 16, 1995 [JP] Japan ................................. 7-051799

[51] Int. Cl.$^6$ ..................................................... G06F 1/32
[52] U.S. Cl. ............................................ 713/320; 713/300
[58] Field of Search ........................... 395/750.01, 750.08

[56] References Cited

U.S. PATENT DOCUMENTS 5,483,464 1/1996 Song ........................................ 395/750
5,504,908 4/1996 Ikeda ....................................... 395/750

Primary Examiner—Ayaz R. Sheikh
Assistant Examiner—David A. Wiley
Attorney, Agent, or Firm—Jay H. Maioli

[57] ABSTRACT

A system including a plurality of electronic devices connected together through a bus, which can realize reduction in power consumption while ensuring communications. When a bias voltage on an external bus is detected by a bias detecting circuit and a comparator, a bias voltage is output from a bias output terminal to the external bus enabling it. When a driver and receiver receive a PHY-SLEEP command through the external bus, the bias voltage kept output from the bias output terminal to the external bus is turned disabling it.

2 Claims, 11 Drawing Sheets

POWER SAVING CONTROL SYSTEM AND METHOD FOR USE WITH SERIALLY CONNECTED ELECTRONIC DEVICES

This is a division of prior application Ser. No. 08/598,946 filed Feb. 9, 1996 now U.S. Pat. No. 5,790,876.

BACKGROUND OF THE INVENTION

The present invention relates to an electronic device adapted for operation with a P1394 serial bus, for example, and more particularly to a control technique intended to save power in such an electronic device.

Conventionally designed is a system including electronic devices such as a personal computer (which will be hereinafter referred to as "PC"), a digital video tape recorder (which will be hereinafter referred to as "D-VTR"), and a digital television receiver (which will be hereinafter referred to as "D-TV") together through a P1394 serial bus to perform communication of a digital video signal, digital audio signal, and control signal between these electronic devices.

Figure 12:
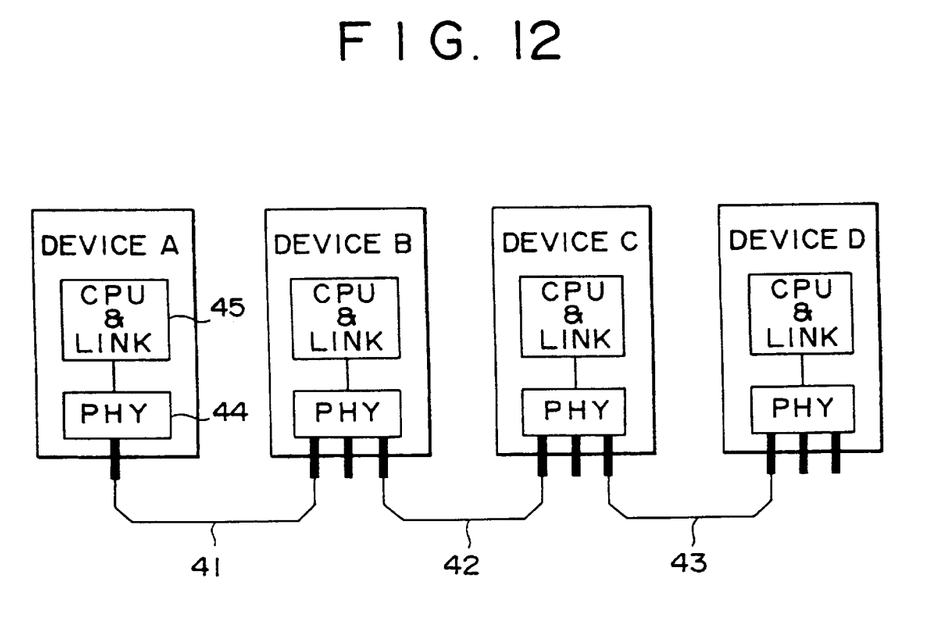
FIG. 12 is a view showing an example of a system including a plurality of devices connected together through a P1394 serial bus to perform communication between these devices.

FIG. 12 shows an example of such a system. Referring to FIG. 12, electronic devices A to D represent a PC, D-VTR, etc. as mentioned above. The electronic devices A and B are connected together through a P1394 serial bus cable 41; the electronic devices B and C are connected together through a P1394 serial bus cable 42; and the electronic devices C and D are connected together through a P1394 serial bus cable 43.

Each P1394 serial bus cable incorporates two pairs of twisted pair cables with shields (not shown). One of the two pairs of twisted pair cables is used for transmission of data, and the other pair is used for transmission of a strobe signal.

As shown in FIG. 12, each electronic device includes a physical layer controller 44 and a CPU and link layer controller 45 as a basic configuration for performing communication with the corresponding P1394 serial bus. The physical layer controller 44 has a function including initialization of the bus, encoding/decoding of data, and arbitration. The CPU and link layer controller 45 has a link layer control function including generation/detection of an error correction code and generation/detection of a packet, and an application layer function.

In each electronic device having the above configuration, when a power-supply plug (not shown) of the electronic device is inserted into an AC receptacle, a power-supply voltage is supplied to the physical layer controller 44. Accordingly, the power-supply voltage is always supplied to the physical layer controller 44 irrespective of whether or not the bus is used, resulting in undue consumption of power.

This problem may be solved by on/sleep controlling the power-supply voltage to be supplied to the physical layer controller with operation from a user. According to this method, the physical layer controller can be powered on only when the electronic device uses the bus, thereby saving a power consumption. However, when the physical layer controller in the electronic device B shown in FIG. 12, for example, is in a sleep mode, the communication between the electronic device A and the electronic device C cannot be effected unless the user manually sets the electronic device B to an on mode.

SUMMARY OF THE INVENTION

It is accordingly an object of the present invention to provide an electronic device and an operation mode control method therefor which can realize both reduction in power consumption and ensuring of a communication line.

According to a first aspect of the present invention, there is provided an electronic device for use in a system adapted to perform communication between a plurality of electronic devices connected together through a bus; the electronic device comprising first means for detecting a bias voltage output to the bus from another electronic device connected through the bus to the electronic device, and second means for controlling output of a bias voltage to the bus; the second means having a power saving mode where the bias voltage is not output from the electronic device to the bus and a normal operation mode where the bias voltage is output from the electronic device to the bus; and the power saving mode being changed into the normal operation mode when the first means detects the bias voltage output from the other electronic device to the bus.

According to a second aspect of the present invention, there is provided an operation mode control method for an electronic device for use in a system adapted to perform communication between a plurality of electronic devices connected together through a bus; wherein when the electronic device detects a bias voltage output to the bus from another electronic device connected through the bus to the electronic device, an operation mode of the electronic device is changed from a power saving mode where a bias voltage is not output to the bus into a normal operation mode where the bias voltage is output to the bus.

In the first aspect of the present invention, the electronic device further comprises third means for detecting a predetermined command addressed to the electronic device from the other electronic device connected through the bus to the electronic device, wherein when the third means detects the predetermined command, the normal operation mode is changed to the power saving mode.

In the second aspect of the present invention, the method is further characterized in that when the electronic device detects a predetermined command addressed to the electronic device from the other electronic device connected through the bus to the electronic device, the operation mode of the electronic device is changed from the normal operation mode to the power saving mode.

In this method, a predetermined one of the electronic devices in the system asks all the other electronic devices in the system for whether or not they intend to use the bus, and when the predetermined electronic device receives from all the other electronic devices a replay that none of all the other electronic devices intends to use the bus, the predetermined electronic device transmits the predetermined command to all the other electronic devices. One or more electronic devices in the system can become the predetermined electronic device mentioned above.

Alternatively, when any arbitrary one of the electronic devices is commanded by a user, the predetermined command may be transmitted from this arbitrary electronic device to all the other electronic devices in the system.

Further, in this method, when the electronic device detects the predetermined command, the electronic device refrains from detecting the bias voltage output to the bus from the other electronic device connected through the bus to the electronic device for a predetermined period of time.

In the first aspect of the present invention, the electronic device is further characterized in that when the electronic device spontaneously becomes the normal operation mode and the first means does not detect the bias voltage, the second means outputs the bias voltage and becomes the power saving mode where an internal circuit is off.

According to the present invention, when each electronic device detects a bias voltage output to the bus from the other electronic device connected through the bus to the electronic device, the electronic device changes its operation mode from the power saving mode where no bias voltage is output to the bus into the normal operation mode where a bias voltage is output to the bus.

Further, according to the present invention, when each electronic device detects a predetermined command addressed to the electronic device from the other electronic device connected through the bus to the electronic device, the electronic device changes its operation mode from the normal operation mode to the power saving mode.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described in detail with reference to the drawings in the following order.

[1] Configuration for Detecting Bias Voltage Output to Bus
[2] Operation Mode of Physical Layer Controller
   (1) On Mode
   (2) Sleep Mode
   (3) Delay Mode

[1] Configuration for Detecting Bias Voltage Output to Bus

Figure 1:
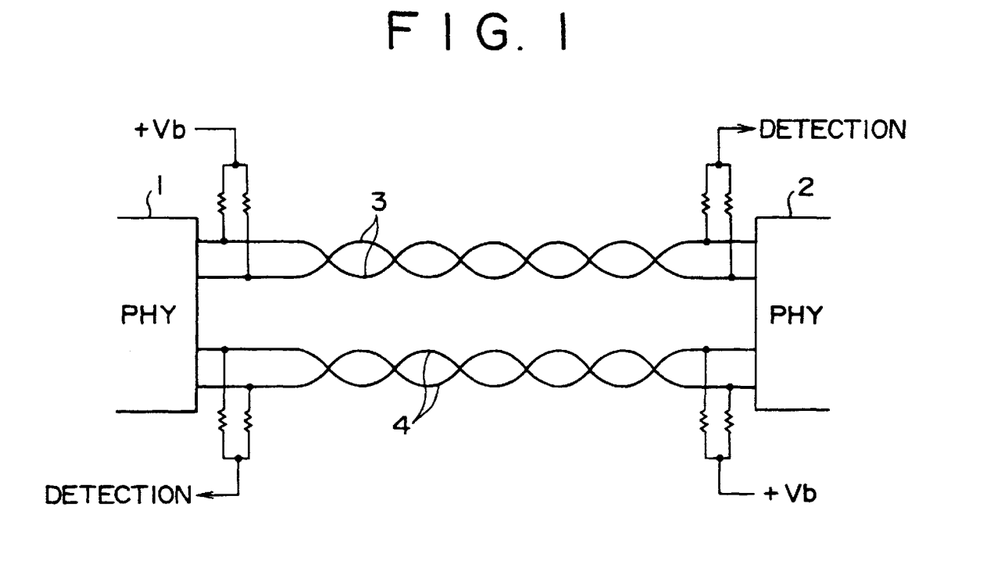
FIG. 1 is a view illustrating the principle according which the device according to the present invention controls a power supply of its own physical layer controller and also controls a power supply of a physical layer controller in another device directly connected to the device through the cable of a P1394 serial bus.

FIG. 1 is a view illustrating a configuration for detecting a bias voltage output to a P1394 serial bus by using a physical layer controller in an electronic device (which will be hereinafter referred to simply as a device) according to the present invention and by using a physical layer controller in another device directly connected to the above device by means of a cable of the P1394 serial bus.

Referring to FIG. 1, physical layer controllers 1 and 2 are directly connected together by twisted pair cables 3 and 4 provided in the cable of the P1394 serial bus. One of the twisted pair cables 3 and 4 is used for bidirectional transmission of data, and the other is used for bidirectional transmission of a strobe signal as previously described in the Background section. The physical layer controller 1 is configured so as to supply a bias voltage Vb through resistors to the twisted pair cable 3 and detect a bias voltage on the twisted pair cable 4 through resistors. On the other hand, the physical layer controller 2 is configured so as to supply a bias voltage Vb through resistors to the twisted pair cable 4 and detect a bias voltage on the twisted pair cable 3 through resistors.

[2] Operation Mode of Physical Layer Controller

Each of the physical layer controllers 1 and 2 has three operation modes, i.e., (1) an on mode (normal operation mode), (2) a sleep mode (power saving mode), and (3) a delay mode.

The on mode is a mode where each physical layer controller performs a normal operation. In this mode, the physical layer controller in a device outputs a bias voltage to the bus, and detects a bias voltage output to the bus from another device connected to the bus.

The sleep mode is a mode where each physical layer controller does not output a bias voltage Vb, but performs only an operation for detecting a bias voltage. In this mode, each physical layer controller is in a sleep condition, so that a power consumption is small.

The delay mode is a mode temporarily taken in transition from the on mode to the sleep mode. In this mode, each physical layer controller does not output a bias voltage Vb and does not perform the detection of a bias voltage for a given period of time. The significance of the delay mode will be described later.

The above-mentioned three modes will now be described in sequence.

(1) On Mode

In the present invention, the procedure of setting each physical layer controller to the on mode is classified into (a) a procedure wherein the physical layer controller spontaneously becomes the on mode and (b) a procedure wherein the physical layer controller detects a bias voltage on the bus and then becomes the on mode. These procedures will now be described in sequence.

(a) Procedure wherein the physical layer controller spontaneously becomes the on mode:

The physical layer controller in a device that wants to use the bus can spontaneously become the on mode. For example, referring to FIG. 1, in the case that the device having the physical layer controller 1 is a D-VTR and the device having the physical layer controller 2 is a D-TV, and that a reproduced signal from the former is to be displayed on the latter, the physical layer controller 1 spontaneously becomes the on mode in response to playback button operation by a user.

Figure 2:
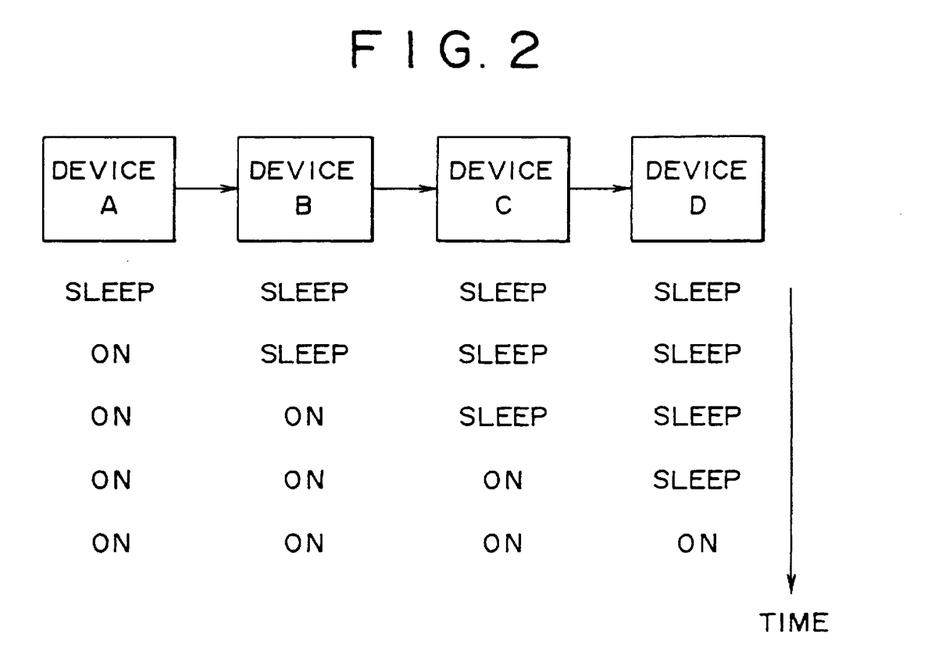
FIG. 2 is a view illustrating a manner where when one of the devices becomes an on mode, the other all devices successively become an on mode.

(b) Procedure wherein the physical layer controller detects a bias voltage on the bus and then becomes the on mode:

When the physical layer controller in a device becomes the on mode to output a bias voltage Vb, the physical layer controller in another device directly connected to the above device by the twisted pair cable detects the bias voltage Vb to become the on mode. In the case shown in FIG. 1, for example, when the physical layer controller 1 first becomes the on mode to supply a bias voltage Vb to the twisted pair cable 3, the physical layer controller 2 detects this bias voltage to subsequently become the on mode. Conversely, when the physical layer controller 2 first becomes the on mode, the physical layer controller 1 detects the bias voltage on the twisted pair cable 4 to subsequently become the on mode. Accordingly, in the system as shown in FIG. 12, this procedure is shown in FIG. 2, in which when a device A first becomes the on mode in the condition where all devices A, B, C, and D have been in the sleep mode, the other devices B, C, and D become the on mode successively as time elapses.

Figure 3:
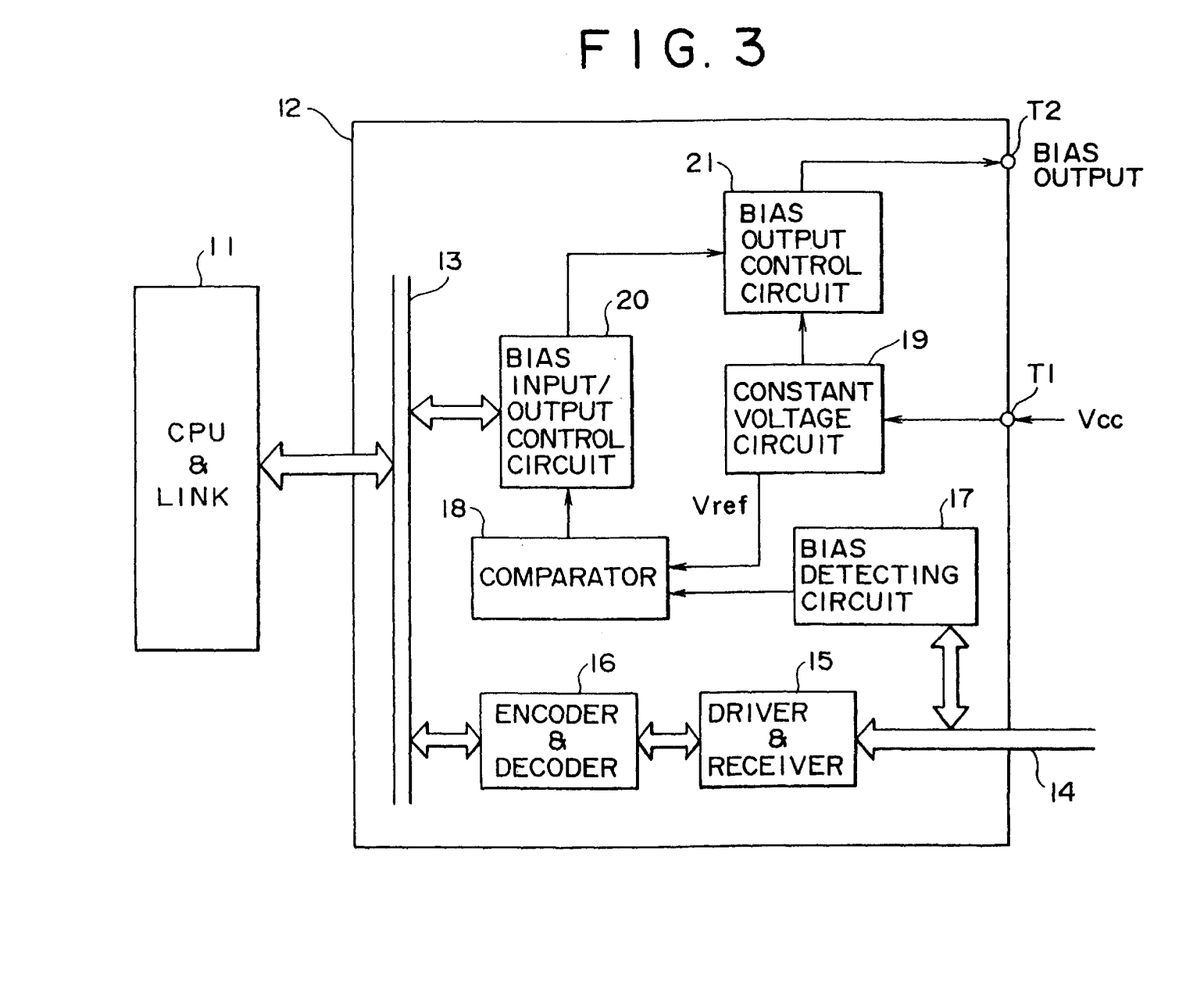
FIG. 3 is a block diagram of a configuration for detecting a bias voltage on a twisted pair cable to turn on the physical layer controller.

A circuit configuration for realizing the above operation will now be described. FIG. 3 is a block diagram showing an example of the internal configuration of a physical layer controller 12. The physical layer controller 12 is connected through an internal bus 13 to a CPU and link layer controller 11. Further, the controller 12 is connected through a cable of an external bus (P1394 serial bus) 14 to another device.

The physical layer controller 12 includes a circuit for transmitting and receiving a signal to and from the external bus 14. This circuit comprises a driver and receiver 15 connected to the external bus 14 and an encoder and decoder 16 connected to the driver and receiver 15. The driver and receiver 15 transmits and receives a signal to and from the external bus 14. The encoder and decoder 16 encodes a signal to be transmitted and decodes a signal received. Further, the encoder and decoder 16 communicates with the CPU and link layer controller 11 through the internal bus 13. Although these elements are not related with the operation for setting the physical layer controller 12 to the on mode, they are required to set the controller 12 to the sleep mode as will be hereinafter described.

A configuration for detecting a bias voltage on the twisted pair cable and setting the physical layer controller 12 to the on mode will now be described with reference to FIG. 3. To realize this configuration, the physical layer controller 12 includes a bias detecting circuit 17 for detecting a bias voltage on the external bus 14, a comparator 18 for comparing a bias detection output generated from the bias detecting circuit 17 and a reference voltage Vref generated from a constant voltage circuit 19 to be hereinafter described and for outputting a result of this comparison, the constant voltage circuit 19 for generating the reference voltage Vref from a voltage Vcc generated by a power circuit (not shown) and input from a terminal T1 and for supplying a bias voltage to a bias output control circuit 21 to be hereinafter described, a bias input/output control circuit 20 for sending the comparison output from the comparator 18 through the internal bus 13 to the CPU and link layer controller 11 and for transmitting a bias output command received from the CPU and link layer controller 11 to the bias output controller 21, and the bias output controller 12 for performing on/off control so that the bias voltage generated from the constant voltage circuit 19 is output to a terminal T2 according to the bias output command received from the bias input/output control circuit 20.

There will now be described the operation wherein the physical layer controller 12 detects a bias voltage on the twisted pair cable to become the on mode. In the configuration shown in FIG. 3, when the physical layer controller in another device connected through the external bus 14 to the device including the physical layer controller 12 becomes the on mode and supplies a bias voltage to the twisted pair cable in the external bus 14, this bias voltage is detected by the bias detecting circuit 17 and is then input into the comparator 18. When the physical layer controller in the other device is in the on mode, the bias detection input and the reference voltage Vref coincide with each other. Therefore, the comparator 18 sends a coincidence signal to the bias input/output control circuit 20. Then, the bias input/output control circuit 20 sends a coincidence output to the CPU and link layer controller 11. Then, the CPU and link layer controller 11 checks the coincidence output to thereby determine that the physical layer controller in the other device has supplied a bias voltage to the bus, and next sends to the bias input/output control circuit 20 a command signal for making the physical layer controller 12 output a bias voltage. When the bias input/output control circuit 20 receives this command signal, it commands the bias output control circuit 21 to output a bias voltage generated by the constant voltage circuit 19 to the terminal T2. As a result, the bias voltage generated by the constant voltage circuit 19 is passed through the bias output control circuit 21 and is supplied from the terminal T2 to the twisted pair cable in the external bus 14.

Figure 4:
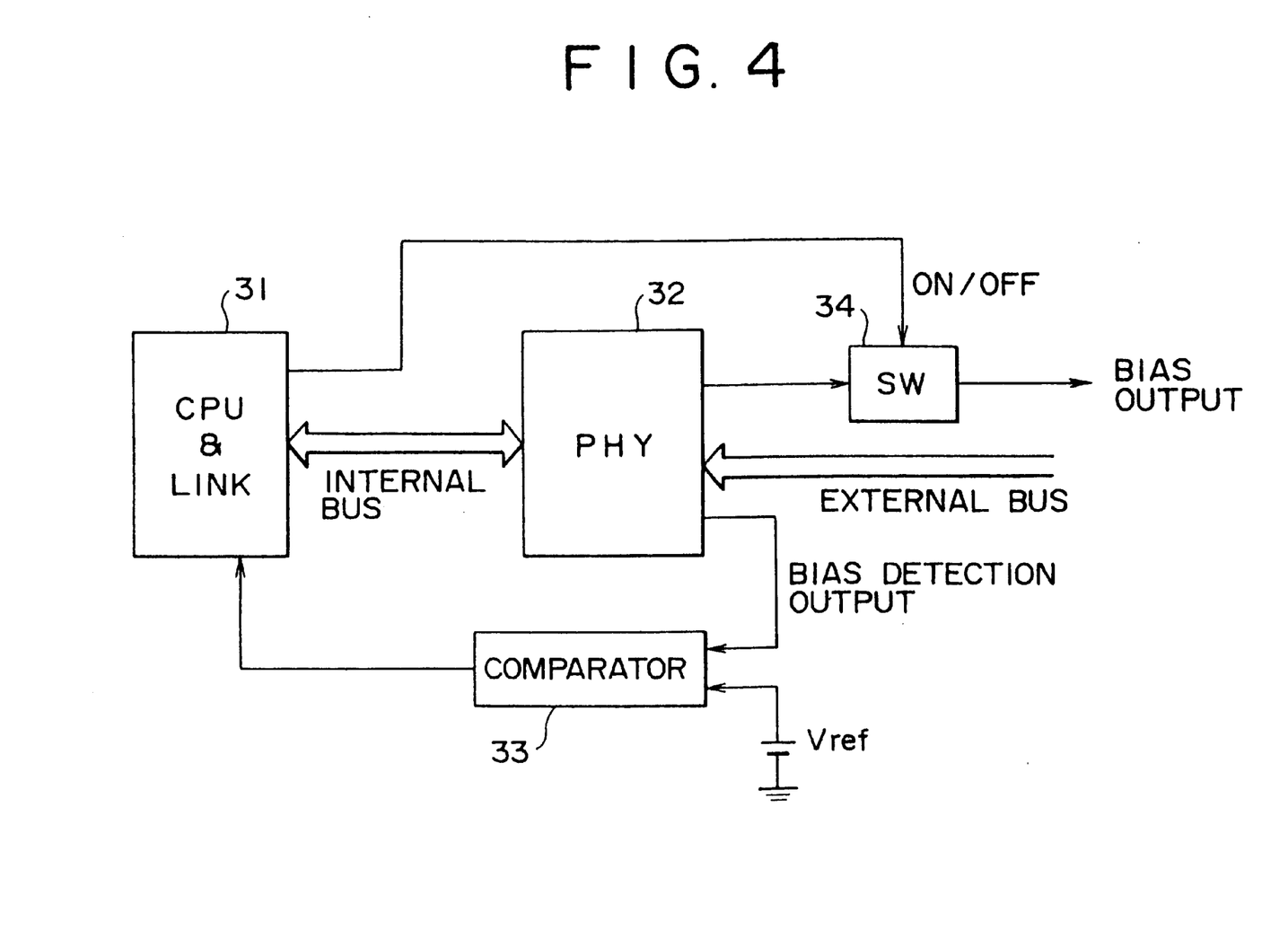
FIG. 4 is a block diagram of another configuration for detecting a bias voltage on a twisted pair cable to turn on the physical layer controller.

FIG. 4 shows another configuration for detecting a bias voltage on the twisted pair cable to set the physical layer controller to the on mode. In this configuration, there are provided outside a physical layer controller 32 a comparator 33 for comparing a reference voltage Vref and a bias detection output detected by a bias detecting circuit (not shown) included in the physical layer controller 32 and for outputting a result of this comparison, and a switching circuit 34 for on/off controlling a bias voltage generated in the physical layer controller 32.

The comparator 33 compares the bias detection output and the reference voltage Vref and sends the comparison output to a CPU and link layer controller 31. The CPU and link layer controller 31 on/off controls the switching circuit 34 according to the comparison output from the comparator 33. That is, when the bias detection input coincides with the reference voltage Vref, the CPU and link layer controller 31 turns on the switching circuit 34. When the switching circuit 34 is turned on, the bias voltage generated in the physical layer controller 32 is supplied to the twisted pair cable.

In other words, this preferred embodiment is configured by providing the comparator 18 and the bias output control circuit 21 outside the physical layer controller and connecting these elements 18 and 21 through control lines to the CPU and link layer controller.

(2) Sleep Mode

Having thus described the procedure for setting the physical layer controller to the on mode, there will now be described a procedure for setting the physical layer controller to the sleep mode.

The device according to the present invention has two basic functions for setting the physical layer controller to the sleep mode. One of the two basic functions is that a command (which will be hereinafter referred to as "PHY-SLEEP command") for setting the physical layer controller to the sleep mode is defined, and that each device sets its own physical layer controller to the sleep mode when receiving this command. The other basic function is that at least one device connected to the bus grasps the status of all devices connected to the bus according to a host protocol, and that the device transmits the PHY-SLEEP command when none of all devices intends to use the bus. These functions are executed by application software installed in the CPU and link layer controller 11 shown in FIG. 3.

There will now be described a procedure according to which the device having such functions becomes the sleep mode. The device becomes the sleep mode when it does not intend to use the bus. However, as described with reference to FIG. 2, when there is any one device having the on mode in the system, all devices in the system become the on mode. Therefore, to set the device to the sleep mode, it is necessary that none of all devices in the system intends to use the bus.

The present invention adopts first to fourth procedures as a procedure for recognizing that none of all devices intends to use the bus.

According to the first procedure, a device or bus manager (which will be hereinafter referred to as "BM") for managing the status of use of the bus by all devices in the system is provided in the system, and the BM periodically (e.g., at the intervals of 10 minutes) asks each device for whether or not each device intends to use the bus. In receiving this inquiry, each device sends back to the BM a reply that it does not intend to use the bus and wants to keep the sleep mode. In receiving the reply that none of all devices intends to use the bus, the BM transmits the PHY-SLEEP command to each device. Then, each device having received the PHY-SLEEP command sets its own physical layer controller to the sleep mode. After transmitting the PHY-SLEEP command, the physical layer controller in the BM itself also becomes the sleep mode.

Figure 5:
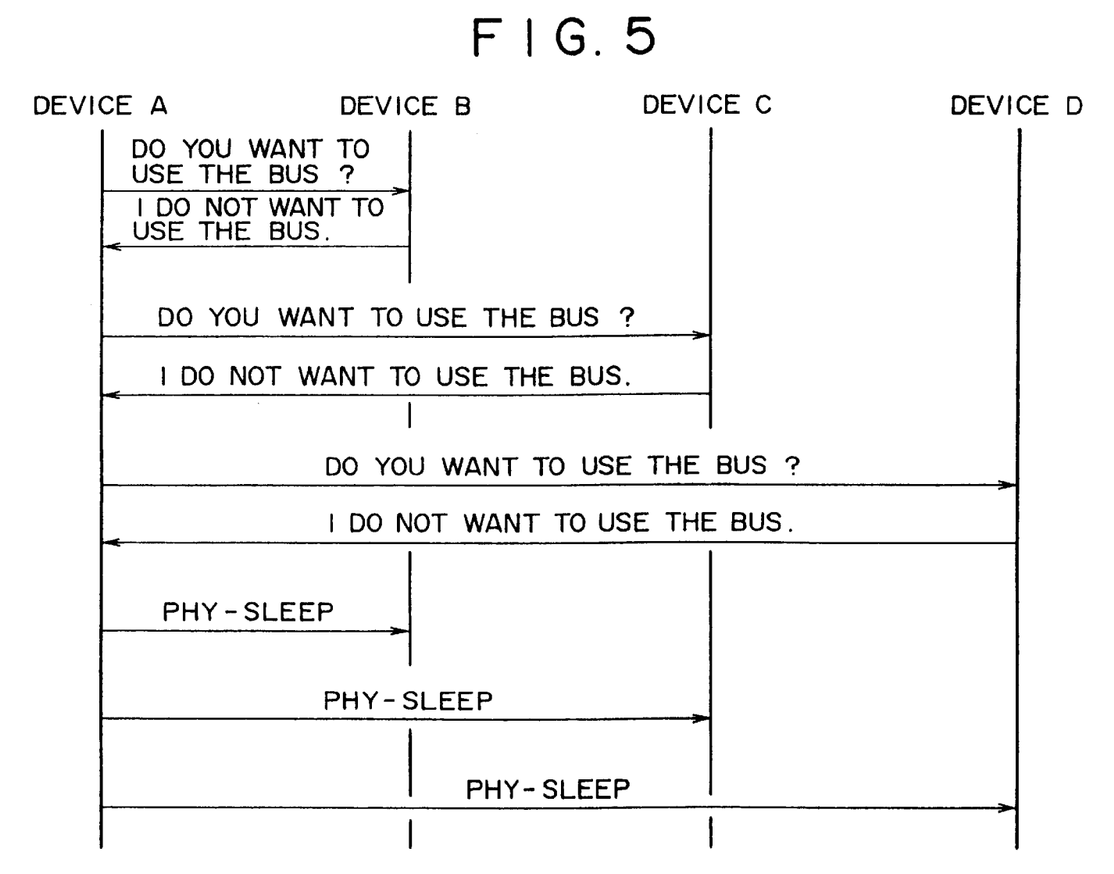
FIG. 5 is a view illustrating a procedure wherein a BM asks all the other devices for whether or not they intend to use the bus, and thereafter transmits a PHY-SLEEP command packet.

FIG. 5 is an illustration of this communication procedure. In this illustration, the device A functions as the BM, and it sequentially asks each of the devices B, C, and D for whether or not they intend to use the bus. After receiving the reply that none of the devices B, C, and D intends to use the bus, the device A sequentially transmits the PHY-SLEEP command to the devices B, C, and D.

Figure 6:
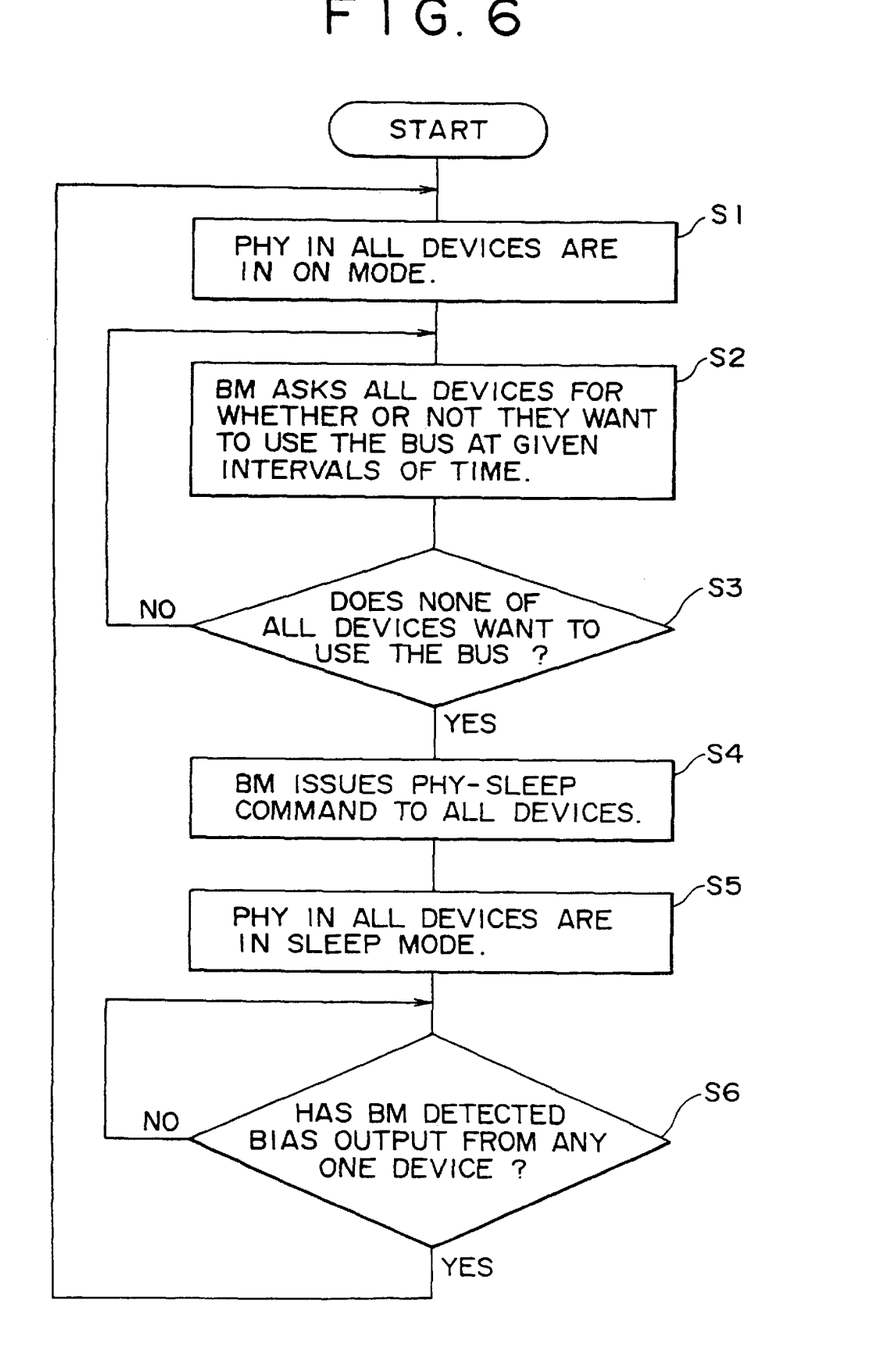
FIG. 6 is a flowchart showing the operation of the BM in executing the communication procedure shown in FIG. 5.

FIG. 6 is a flowchart illustrating the operation of the BM in this case. Step S1 shows that the physical layer controllers in all devices including the BM are in the on mode. Steps S2 to S4 are processes corresponding to the operation of the communication procedure shown in FIG. 5. Step S5 shows that the physical layer controllers in all devices including the BM are in the sleep mode. Step S6 shows a process that after becoming the sleep mode, the physical layer controller in the BM detects a bias voltage on the twisted pair cable. If any one of all devices has become the on mode, the program returns to step S1 because all devices become the on mode.

The second procedure is that a plurality of devices having the function of the BM mentioned above are preliminarily provided in the system, and one of these devices is specified by user's setting, for example, to perform the same operation as that of the BM mentioned above. For example, in the case where all devices in the system have the function of the BM, any one of all devices that intends to become the sleep mode periodically asks the other devices connected to the bus for whether or not they intend to use the bus. In receiving a reply that none of all the other devices intends to use the bus, the specified device transmits the PHY-SLEEP command to all the other devices. Thereafter, the specified device also becomes the sleep mode. Also in this case, the communication procedure and the operation flow are substantially the same as those in the first procedure.

Figure 7:
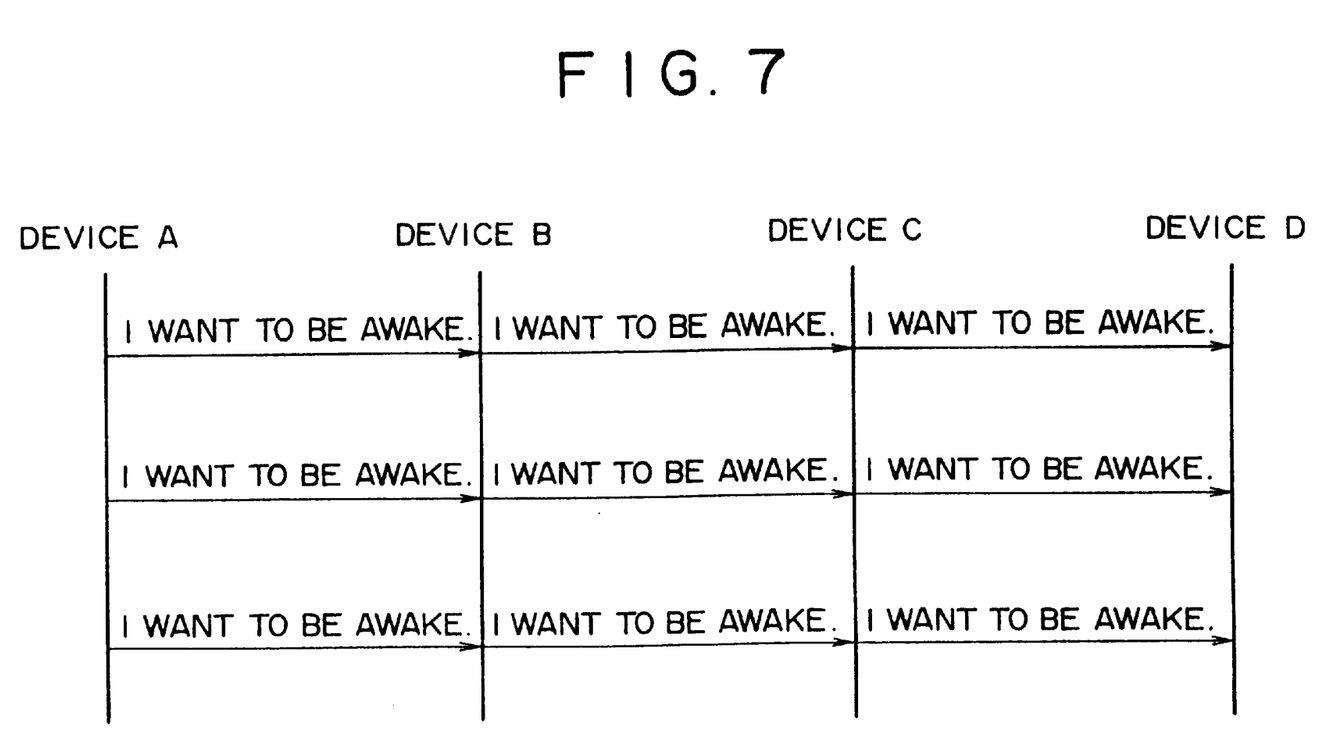
FIG. 7 is a view illustrating a procedure for transmitting by broadcast a packet indicating that the device intends to keep the on mode.

The third procedure is that any one device that does not intend to become the sleep mode preliminarily transmits periodically (e.g., at the intervals of 10 minutes) by broadcast to all the other devices in the system a packet indicating that the one device intends to be awake (i.e., keep the on mode). FIG. 7 illustrates this procedure in the case that the device A transmits this packet. When this packet is not flowing in the bus, each device can determine that none of the other all devices intends to use the bus. When the BM in the first procedure or the device having the function of the BM in the second procedure detects that this packet is absent on the bus, it transmits the PHY-SLEEP command to all the other devices. That is, unlike the first and second procedures wherein all the other devices send back a reply that they do not intend to use the bus in response to the inquiry, the third procedure is characterized in that they spontaneously inform their intention of no use of the bus.

The fourth procedure is that any one device is preliminarily specified in the system, and that a register (which will be hereinafter referred to as "sleep register") for registering whether or not all devices in the system intend to become the sleep mode is preliminarily provided in the above specified device. All devices are preliminarily informed of the address of the specified device having the sleep register on the bus. The device that intends to become the sleep mode sets its flag in the sleep register. Then, the device that intends to become the sleep mode determines from flags in the sleep register whether or not all the other devices intend to become the sleep mode. If all the other devices intend to become the sleep mode, the device intending to become the sleep mode transmits the PHY-SLEEP command to all the other devices. Thereafter, the device intending to become the sleep mode also becomes the sleep mode.

Figure 8:
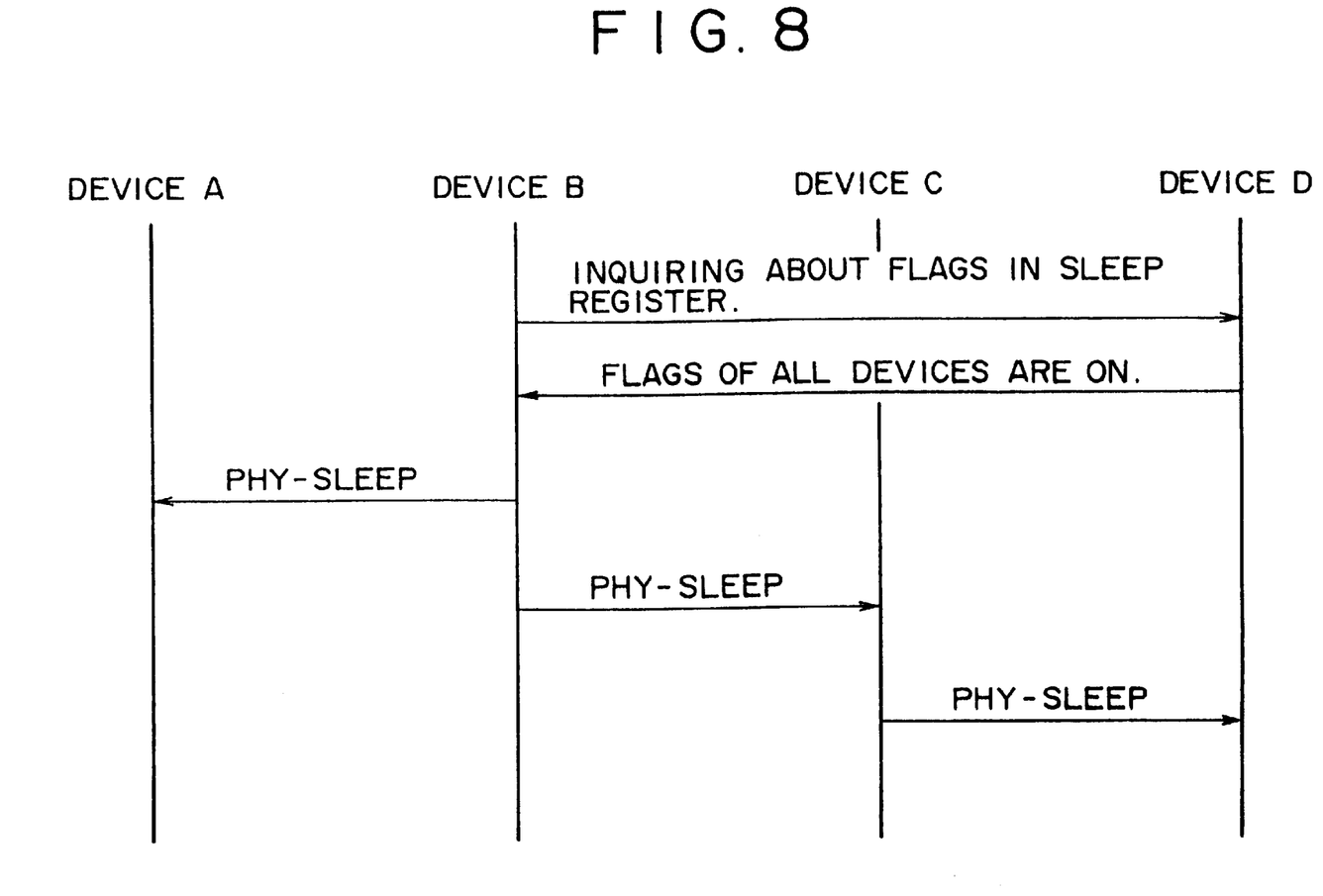
FIG. 8 is a view illustrating a procedure wherein the device asks the contents in a sleep register and thereafter transmits a PHY-SLEEP command packet.

FIG. 8 illustrates an example of this procedure. In this case shown in FIG. 8, the sleep register is provided in the device D, and the device B is a device intending to become the sleep mode. The device B first checks the flags in the sleep register provided in the device D. After confirming that the flags of all devices are on, the device B transmits the PHY-SLEEP command to the devices A, C, and D.

Figure 9:
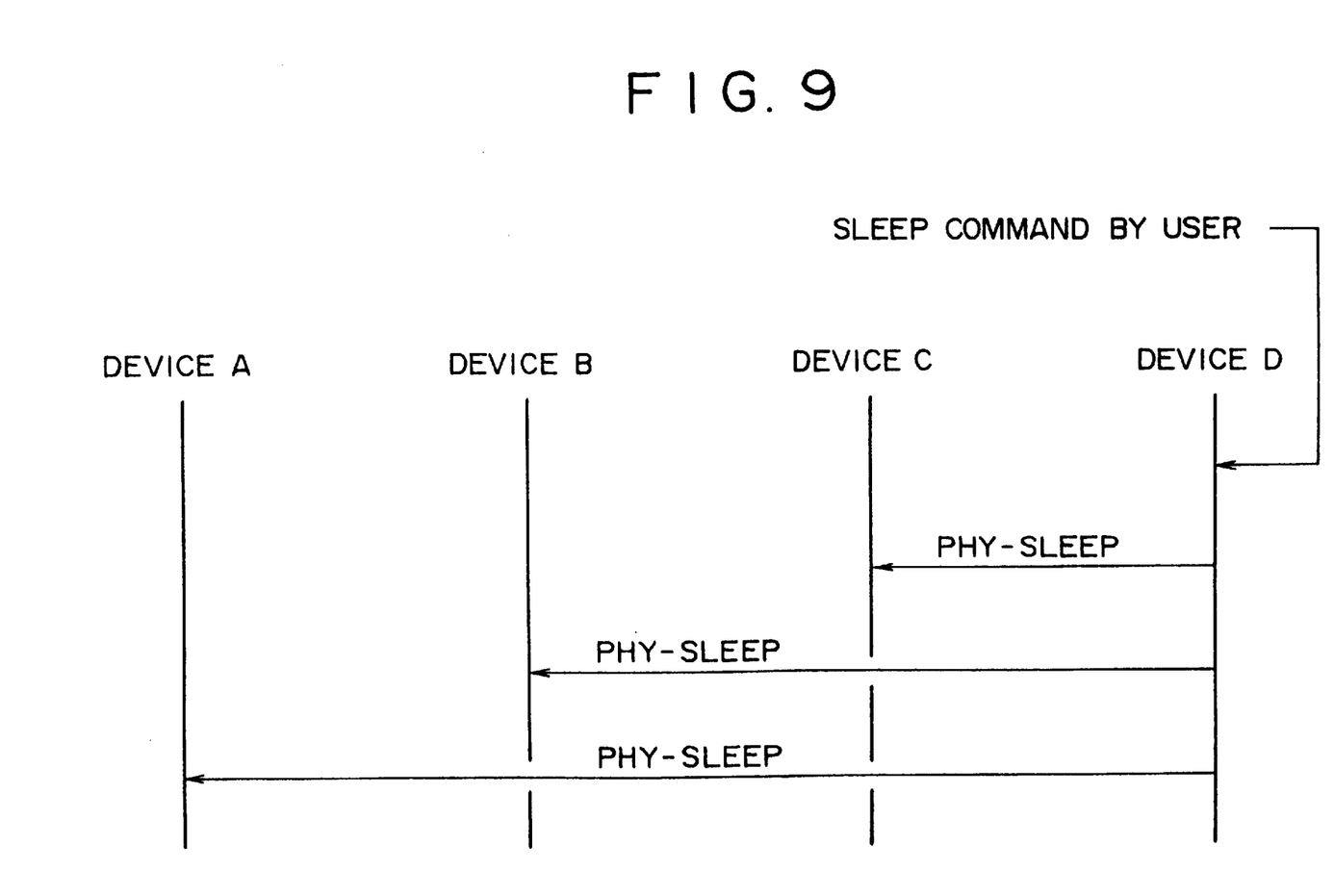
FIG. 9 is a view illustrating a communication procedure wherein the operation mode of each device is forcibly changed to a sleep mode by a command from a user.

Having thus described various procedures for confirming that none of all devices in the system intends to use the bus, the present invention further includes another procedure that a device commanded by the user transmits the PHY-SLEEP command to all the other devices. An example of a communication procedure in this case is shown in FIG. 9. In this communication procedure, the user applies a sleep command to the device D. Accordingly, after transmitting the PHY-SLEEP command to the devices C, B, and A, the device D also becomes the sleep mode.

However, precedence is present in this procedure in such a manner that a certain device cannot be set to the sleep mode according to application. For example, while any one of the other devices C, B, and A is performing video recording, dubbing, etc., this device cannot be set to the sleep mode though it has received the PHY-SLEEP command from the device D. In this case, the other devices not performing video recording, dubbing, etc. instantaneously become the sleep mode, but all devices are finally returned to the on mode because the system includes a device that cannot be set to the sleep mode.

Further, the present invention includes a procedure that after a device spontaneously becomes the on mode, it detects that it is not connected to the bus and then becomes the sleep mode. The operation flow (subroutine) in this procedure is shown in FIG. 10.

Figure 10:
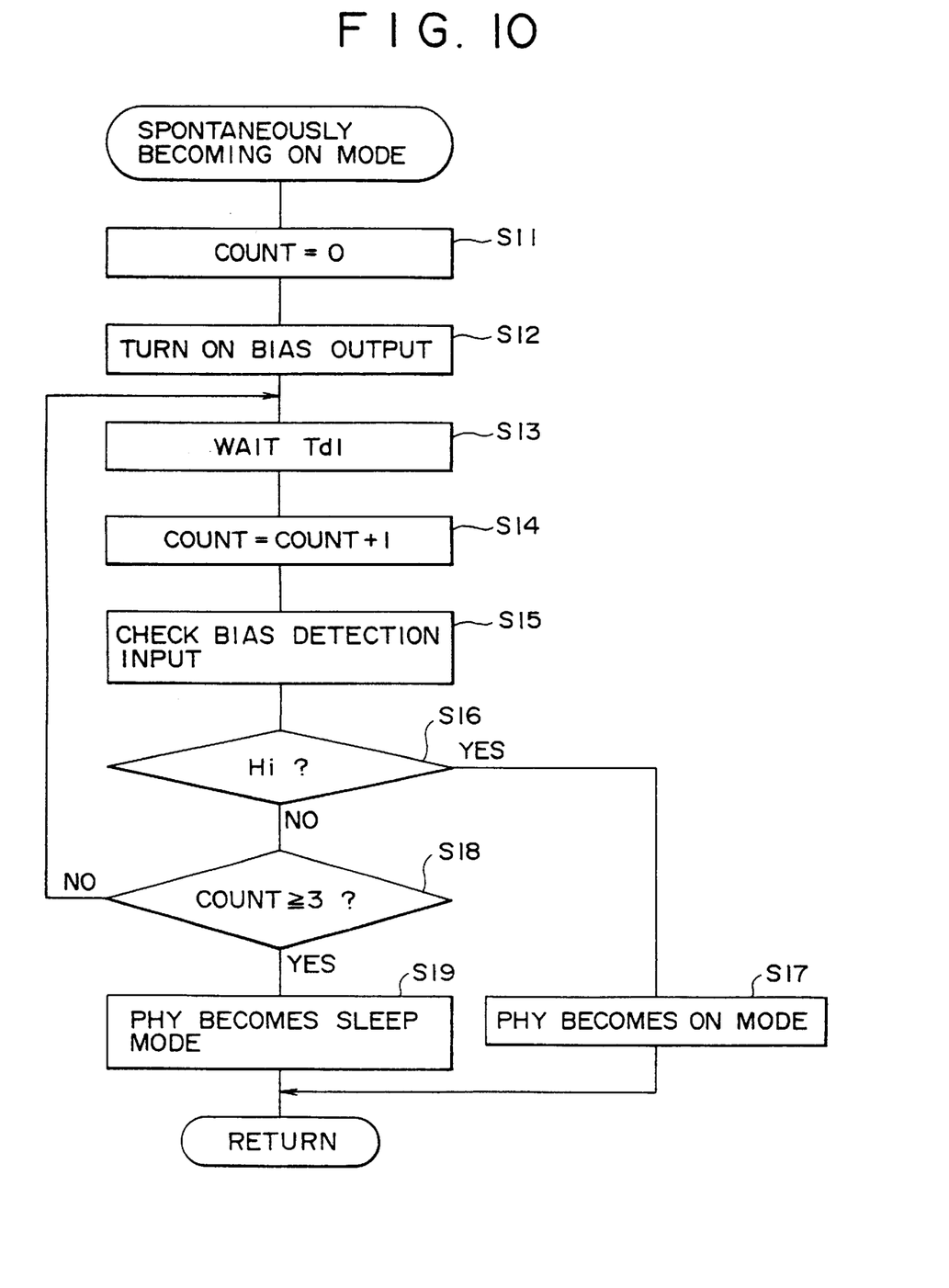
FIG. 10 is a flowchart showing the operation in the case where the device spontaneously becomes an on mode and thereafter detects that it is not connected to the bus, then spontaneously becoming a sleep mode.

Referring to FIG. 10, a counter is first set to 0 in step S11. This counter is provided in the CPU and link layer controller 11 shown in FIG. 3. Then, a bias output is turned on in step S12. That is, in FIG. 3, the CPU and link layer controller 11 sends a bias output command to the bias input/output control circuit 20.

Then, after waiting the time Td1 in step S13, the counter is incremented by 1 in step S14. Then, a bias detection input is checked in step S15, and the level of the bias detection input is determined in step S16. If the level is high, the device spontaneously becomes the on mode (step S17). The operation of these steps is performed to determine whether or not the device is connected to the bus after outputting a bias. That is, if the device is connected to the bus, the other devices connected to the bus also become the on mode as described with reference to FIG. 2. Accordingly, the bias detection input becomes a high level, and the comparator 18 shown in FIG. 3 therefore outputs a coincidence signal. To the contrary, if the device is not connected to the bus, the device cannot detect a bias voltage supplied from the physical layer controller in any one of the other devices. Accordingly, the bias detection input becomes a low level, and the comparator 18 outputs no coincidence signal.

Steps S13 to S16 mentioned above are repeatedly executed until the counter becomes 3, that is, for the time period three times the time period Td1 after the device becomes the on mode. If the level of the bias detection input does not become high even after this time period, the device determines that it is not connected to the bus, and then becomes the sleep mode (steps S18 and S19).

(3) Delay Mode

This mode is a mode temporarily set when the device in the on mode is shifted to the sleep mode in receipt of the PHY-SLEEP command. The duration T of the delay mode is ended when at least the whole of the system becomes off. The purpose of providing the delay mode is to avoid a possibility that when the device in the on mode receives the PHY-SLEEP command from another device to shift to the sleep mode, and thereafter another device not yet shifted to the sleep mode is present in the system, the device already shifted to the sleep mode may be returned to the on mode by a bias voltage from the other device not yet shifted to the sleep mode.

Figure 11:
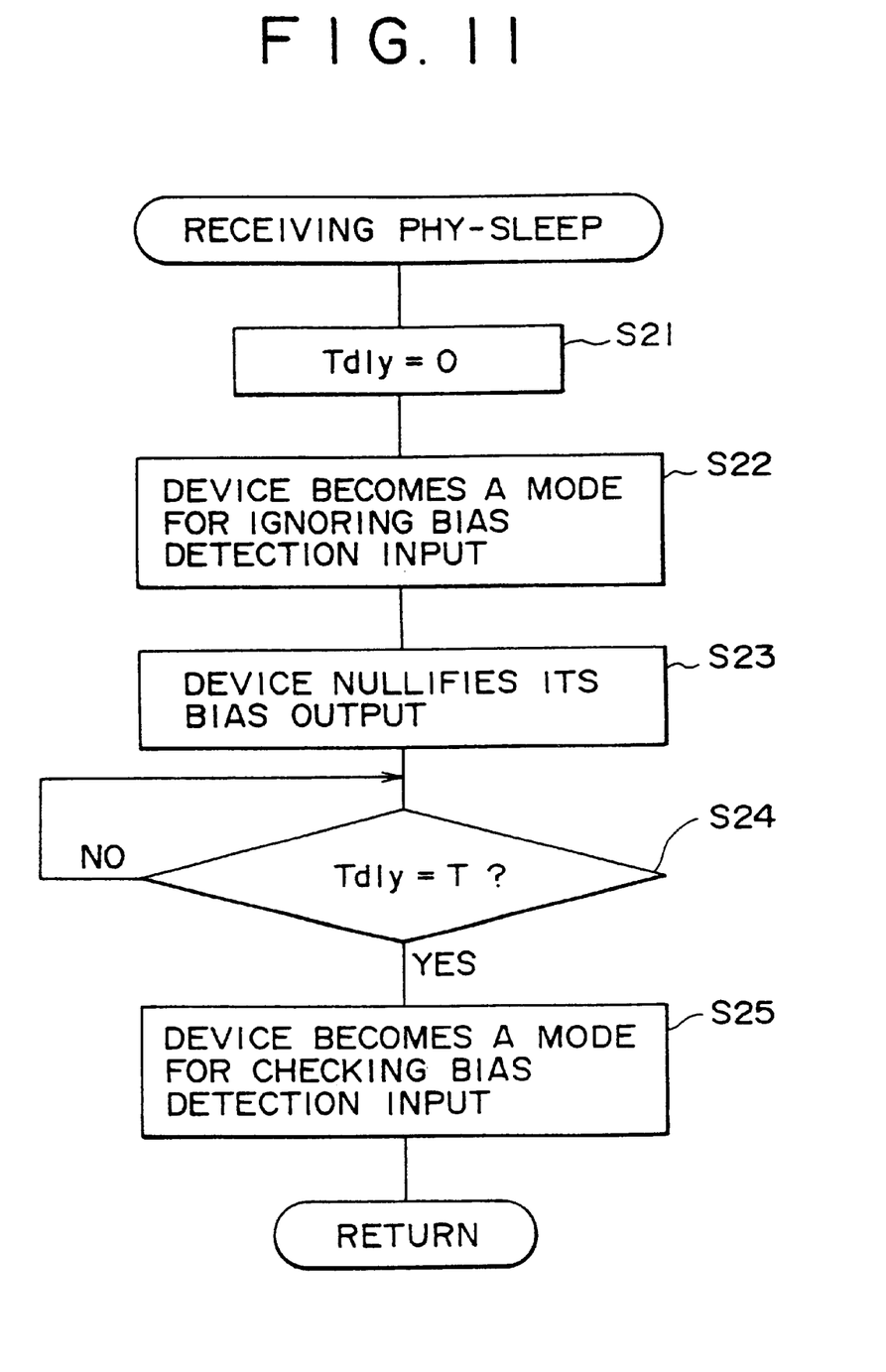
FIG. 11 is a flowchart showing an example of the operation of a delay mode.

An example of the operation flow (subroutine) of this mode is shown in FIG. 11. The subroutine is started when the device receives the PHY-SLEEP command. In step S21, a delay time counter Tdly is set to 0. Then, the device becomes a mode for ignoring a bias detection input on the bus, and the device nullifies its bias output (steps S22 and S23). The ignorance of the bias detection input on the bus means that the CPU of the CPU and link layer controller 11 shown in FIG. 3 ignores signals transmitted from the comparator 18 and the bias input/output control circuit 20 in the physical layer controller 12. When the count value of the counter Tdly becomes the above-mentioned duration T from this condition, the device becomes a mode for checking the bias detection input (steps S24 and S25). Then, this subroutine is returned to the main routine.

While each of all devices in the system has a CPU and link layer controller in the above preferred embodiment, the system may include a device having only a physical layer controller like a router in a system. In this case, the physical controller cannot be set to the sleep mode by the PHY-SLEEP command. Accordingly, the physical layer controller may be forcibly set to the sleep mode by a hard switch or the like.

As described above, the present invention provides a function of periodically grasping the state of each device in the system and setting all devices in the system to the power saving mode as required. Accordingly, the power consumption of the system can be minimized to thereby accelerate energy saving.

Further, according to the present invention, any one device in the system set in the power saving mode can detect a bias voltage output from another device to the bus and change the power saving mode to the normal operation mode, then outputting a bias voltage to the bus. Accordingly, when any one device in the system becomes the normal operation mode, all devices in the system are successively changed from the power saving mode to the normal operation mode. Therefore, the present invention can avoid the prior art problem such that communication cannot be effected because of the off-state of an intermediate device.

Additionally, the device having received a command for setting the power saving mode from another device in the system refrains from detecting a bias voltage for a given period of time. Therefore, it is possible to prevent a problem that before the other device turns off a bias voltage, the device may detect the bias voltage and return to the normal operation mode.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A control device for each of a plurality of electronic devices including a selected electronic device in a system wherein communications among said plurality of electronic devices connected together through a bus is desired, the control device comprising:

first means for detecting a first bias voltage output to said bus from another one of said plurality of electronic devices connected through said bus to said selected electronic device; and second means for controlling an output of a second bias voltage from said selected electronic device to said bus to said other one of said plurality of electronic devices;

said second means enabling a power saving mode of said selected electronic device when said second bias voltage is not output from said selected electronic device to said bus and enabling a normal operation mode of said selected electronic device when said second bias voltage is output from said selected electronic device to said bus; and said power saving mode of said selected electronic device being switched into said normal operation mode when said first means detects said first bias voltage output to said bus from said other one of said plurality of electronic devices.

2. An operation mode control method for use in a controller for each of a plurality of electronic devices including a selected electronic device in a system where communications among said plurality of electronic devices connected together through a bus is desired, the method comprising the steps of:

detecting a first bias voltage output to said bus from another one of said plurality of electronic devices connected through said bus to said selected electronic device;

controlling an output of a second bias voltage from said selected electronic device to said bus to said other one of said plurality of electronic devices;

switching an operation mode of said selected electronic device from a power saving mode when said second bias voltage is not output to said bus to a normal operation mode when said second bias voltage is output to said bus; and switching said power saving mode of said selected electronic device into said normal operation mode when said first bias voltage is detected from said other one of said plurality of electronic devices.

* * * * *